USO10348076B2

(12) United States Patent
Gallion et al.

(10) Patent No.: US 10,348,076 B2
(45) Date of Patent: Jul. 9, 2019

(54) BLIND HOLE MOUNT

(71) Applicant: Hellermann Tyton Corporation, Milwaukee, WI (US)

(72) Inventors: Justin Gallion, Milwaukee, WI (US); Jonathan Zick, Waukesha, WI (US); Gerard G. Geiger, Jackson, WI (US)

(73) Assignee: HELLERMANNTYTON CORPORATION, Milwaukee, WI (US)

( * ) Notice: Subject to any disclaimer, the term of this patent is extended or adjusted under 35 U.S.C. 154(b) by 0 days.

(21) Appl. No.: 15/247,444

(22) Filed: Aug. 25, 2016

(65) Prior Publication Data

US 2017/0059060 A1 Mar. 2, 2017

Related U.S. Application Data

(60) Provisional application No. 62/209,568, filed on Aug. 25, 2015.

(51) Int. Cl.
F16B 21/08 (2006.01)
F16B 13/06 (2006.01)
(Continued)

(52) U.S. Cl.
CPC ............... *H02G 3/32* (2013.01); *F16B 2/20* (2013.01); *F16B 2/243* (2013.01); *F16B 21/086* (2013.01);
(Continued)

(58) Field of Classification Search
CPC ...... F16B 1/00; F16B 2/00; F16B 3/00; F16B 2/20; F16B 2/243; F16B 21/086;
(Continued)

(56) References Cited

U.S. PATENT DOCUMENTS 2,278,601 A 3/1938 Cotter
3,673,643 A * 7/1972 Kindell ............... F16B 2/241
126/190

(Continued)

FOREIGN PATENT DOCUMENTS

DE 3542669 A1 6/1987
GB 5836 A 10/1913
(Continued)

OTHER PUBLICATIONS

International Search Report pertaining to PCT/US2016/048705, dated Oct. 28, 2016, 8 pages.

*Primary Examiner* — Tan Le
(74) *Attorney, Agent, or Firm* — Robert J. Myers

(57) ABSTRACT

A mounting assembly including a mount member having a head portion and a stud portion extending downwardly from the head portion, and a clip member affixed to the stud portion of the mount member. The head portion may include slot which interacts with a flexible tie for bundling elongate items. The flexible tie may be integrally formed with the assembly or may be provided as a separate piece. A clip member for use with the assembly clip member includes at least one extending arm portion for engaging a reentrant bore and preventing axial withdrawal of the assembly. The arm portion may have a bifurcated end. A diaphragm spring extending downwardly from the head portion may also be provided.

16 Claims, 16 Drawing Sheets

(51) Int. Cl.
*F16B 19/00* (2006.01)
*F16L 3/00* (2006.01)
*F16L 3/12* (2006.01)
*F16L 3/233* (2006.01)
*H02G 3/32* (2006.01)
*F16B 2/20* (2006.01)
*F16B 2/24* (2006.01)

(52) U.S. Cl.
CPC ............ *F16B 2019/006* (2013.01); *F16L 3/12* (2013.01); *Y10S 411/913* (2013.01)

(58) Field of Classification Search
CPC .... F16B 2019/006; H02G 3/32; H02G 3/233; F16L 3/233; F16L 3/32; F16L 3/12; Y10S 411/913
USPC ...... 248/71, 73, 239.1, 316.7, 65, 74.1, 74.3; 24/289, 293, 295, 458, 517; 411/508, 411/913, 48
See application file for complete search history.

(56) References Cited

U.S. PATENT DOCUMENTS

| | | | | |
|---|---|---|---|---|
| 4,043,579 A | * | 8/1977 | Meyer | ................... B60R 19/44 24/293 |
| 5,127,577 A | | 7/1992 | Lynch | |
| 5,148,981 A | | 9/1992 | Lynch | |
| 5,347,690 A | | 9/1994 | Mansoor | |
| 5,388,791 A | | 2/1995 | McCrory | |
| 5,563,450 A | | 10/1996 | Bader | |
| 5,759,004 A | * | 6/1998 | Kuffel | ................... F16B 21/086 24/295 |
| 5,887,319 A | | 3/1999 | Smith | |
| 6,074,150 A | * | 6/2000 | Shinozaki | ........... B60R 13/0206 24/297 |
| 6,381,811 B2 | * | 5/2002 | Smith | ................... F16B 5/0614 24/289 |
| D532,291 S | | 11/2006 | Geers | |
| D545,183 S | | 6/2007 | French | |
| D613,589 S | | 4/2010 | Goodman | |
| D616,431 S | | 5/2010 | Hijmans | |
| 8,152,405 B2 | * | 4/2012 | Dubost | ............... B60R 13/0206 24/293 |
| 8,636,454 B2 | * | 1/2014 | Okada | ................... F16B 5/0642 24/295 |
| 8,772,636 B2 | | 7/2014 | Yamaguchi et al. | |
| D716,641 S | | 11/2014 | Goodman | |
| D722,491 S | | 2/2015 | Ramsauer | |
| D722,492 S | | 2/2015 | Ramsauer | |
| D722,493 S | | 2/2015 | Ramsauer | |
| D730,161 S | | 5/2015 | Veilleux | |
| D737,116 S | | 8/2015 | Lussier | |
| D739,221 S | | 9/2015 | Sendra-Gonzalez | |
| D743,184 S | | 11/2015 | Lin | |
| D762,105 S | | 7/2016 | Prevost | |
| D763,066 S | | 8/2016 | Sugimoto | |
| D769,107 S | | 10/2016 | McLaren Hall | |
| D774,872 S | | 12/2016 | Prevost | |
| 2004/0072457 A1 | | 4/2004 | Conway | |
| 2005/0242247 A1 | | 11/2005 | Geiger | |
| 2012/0217355 A1 | | 8/2012 | Geiger et al. | |
| 2016/0320034 A1 | | 11/2016 | Wessel | |

FOREIGN PATENT DOCUMENTS

| | | |
|---|---|---|
| JP | H11-230137 A | 8/1999 |
| JP | 2010047141 A | 3/2010 |
| JP | 2012057778 A | 9/2010 |
| JP | 2012057778 A | 3/2012 |

* cited by examiner

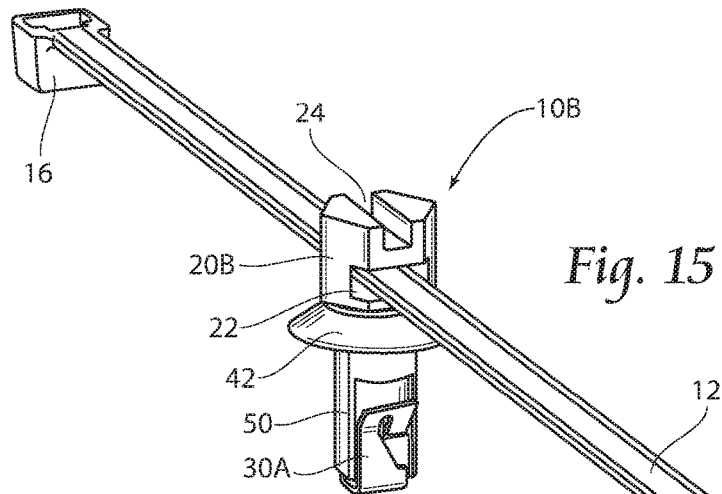
Fig. 15
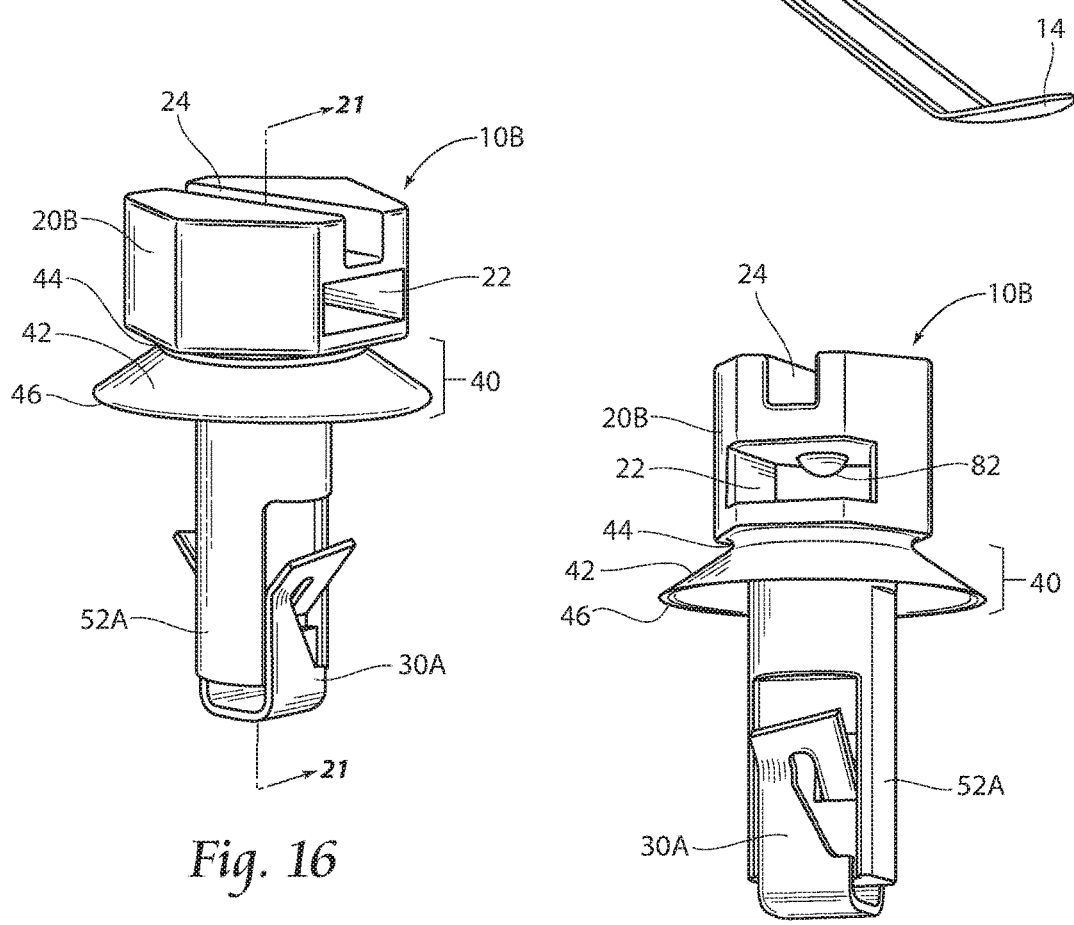
Fig. 16
Fig. 17

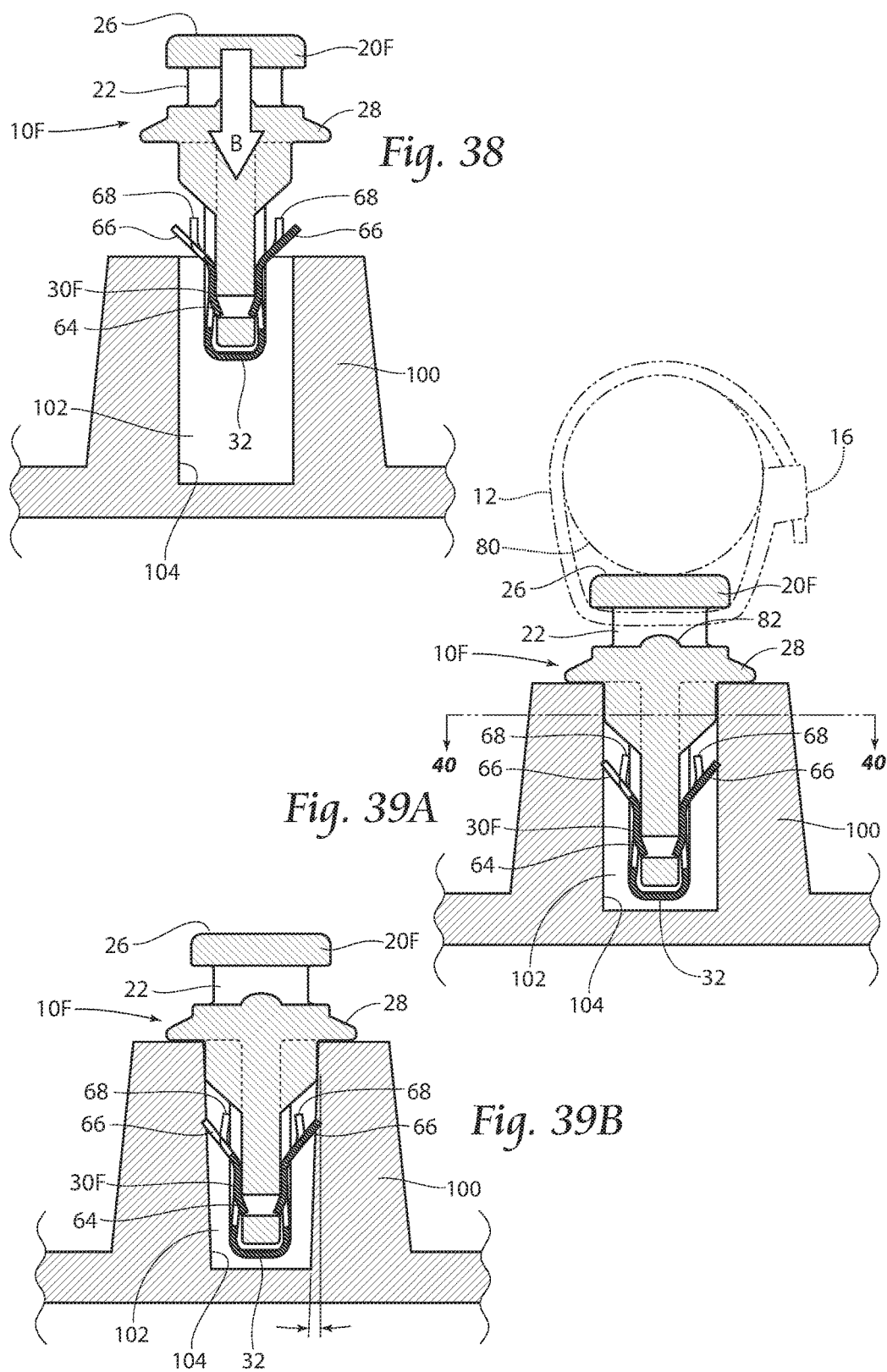

BLIND HOLE MOUNT

RELATED APPLICATIONS

This application claims the benefit of U.S. Provisional Patent Application Ser. No. 62/209,568 entitled "Blind Hole Mount", filed 25 Aug. 2015.

BACKGROUND OF THE INVENTION

This invention relates generally to hardware for securing bundled elongate articles, such as wires, cables, hoses, tubing, fiber optics, conduits, vines, etc., to a supporting structure. More particularly, the invention relates to a mounting structure having a clip element for securing the device to a support surface having a blind hole or reentrant bore.

In many applications, it is sufficient merely to secure items into a bundle. Such applications might include, for example, stationary electronic equipment that remains in one place and is subject to little or no vibration in use. In other applications, it is necessary or desirable not only to secure the items into a bundle, but to secure the resulting bundle to a supporting structure or framework as well. Such applications are also common, for example, in cars, trucks, airplanes, ships, boats and other vehicles where the bundle is likely to be subjected to severe; jostling and vibration. In other applications (e.g. buildings), where vibration might not be an important consideration, it is still desirable to secure and route cables, hoses, tubes, and various components, etc., to a fixed structure. Such support structures may include through bores to enable bundle attachment or may include reentrant bores. Further, certain application may require the bundle to be removed from the support surface. Therefore, it is desirable to initially secure the bundle in a fixed position while retaining the ability to remove the mount if desired.

Many fasteners do not provide efficient, secure retention features that, provide a robust grip when applied in a support surface reentrant bore. Previous fasteners leave room for performance improvement. Such fasteners may not provide sufficient retention and tightness against the support surface for adequately supporting a bundled item. Likewise, such fasteners may utilize a longer than necessary mounting stud and may not be easily inserted into the support surface, or they may be too easily withdrawn from the reentrant bore, thereby lacking in sufficient reliability. The present invention provides a securing and routing fastener, having an improved performance, to address these problems.

SUMMARY OF THE INVENTION

The present invention provides an improved mounting assembly for securely supporting bundled items against a supporting surface, wherein the supporting surface has a reentrant bore. The assembly includes a mount member having a head portion and a stud portion extending downwardly from the head portion. The head portion includes an aperture or slot, which interacts with a flexible tie for bundling the items. The flexible tie may be integrally formed with the assembly or may be provided as a separate piece. The aperture or slot preferably includes an abutment, which provides frictional force for the flexible tie when the flexible tie tail is inserted in the aperture during bundling.

The assembly further includes a clip member affixed to the stud portion of the mount member. The clip member may include a plurality of windows for engaging the stud and at least one extending arm portion for engaging a reentrant bore and preventing axial withdrawal of the assembly. Alternatively the clip member may include a plurality of engaging barbs for engaging the stud and for engaging a reentrant bore and preventing axial withdrawal of the assembly. Alternatively, the clip member may include an extended arm portion having a bifurcated end.

The invention may also include a diaphragm spring extending downwardly from the head portion. The diaphragm spring provides tension and resistance when the mounting stud is inserted into a supporting surface. A mounting assembly according to the present invention may include any combination of the above features.

BRIEF DESCRIPTION OF THE DRAWINGS

FIG. 15 is a perspective view of another assembly according to the present invention and showing a mount member and a clip member, with a cable tie in place in the head portion.

FIG. 16 is a perspective view of the assembly illustrated in FIG. 15.

FIG. 17 is another perspective view of the assembly illustrated in FIGS. 15 and 16.

FIG. 38 is a cross sectional view of the assembly taken along lines 38-38 of FIG. 34 and showing the assembly being positioned for use in a reentrant bore.

FIG. 39A is view similar to that of FIG. 38, but showing the assembly in position for use in a reentrant bore.

FIG. 39B is view similar to that of FIG. 39A, but showing the assembly in position for use in a reentrant bore having tapered sides.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Figure 1:
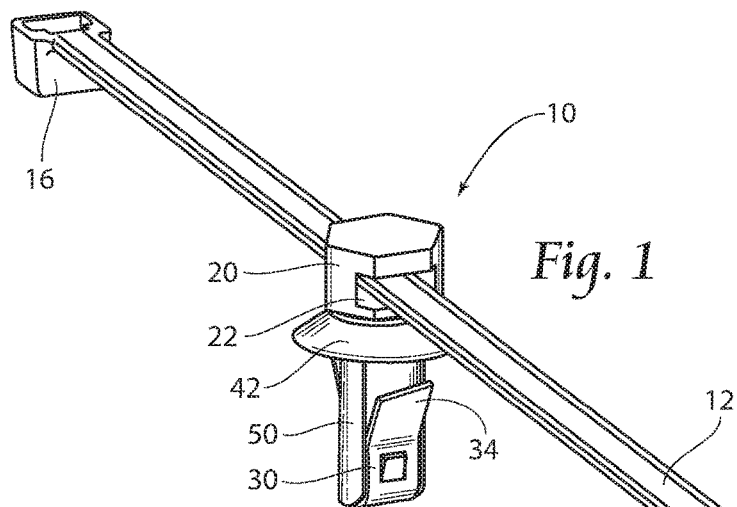
FIG. 1 is a perspective view of an assembly according to the present invention and showing a mount member and a clip member, with a cable tie in place in the head portion.

FIG. 1 shows a mounting assembly 10 according to the present invention interacting with an elongated tie 12. An elongated tie 12 for use with the present invention may include a strap or tie tail 14, and a tie head 16 and may be used in wrapping and securing around an elongate bundle 80 (see FIG. 12), and to thereby secure the bundle 80 to the mounting assembly 10, which is in turn secured to a support member 100 (see FIGS. 11-13). A bundle 80 for use with the present device may consist of a single object or several objects, such as wires, cables, hoses, tubing, or other elongated articles. It will be apparent that a bundle 80 may comprise a bundle of individual wires or cables, rigid or flexible conduit, hot or cold fluid transporting tubes, or hoses. The bundle 80 may also be contained within the bore of a conventional tubular conduit. Likewise, the bundle 80 may be of various sizes and yet be accommodated by the device 10.

Figure 2:
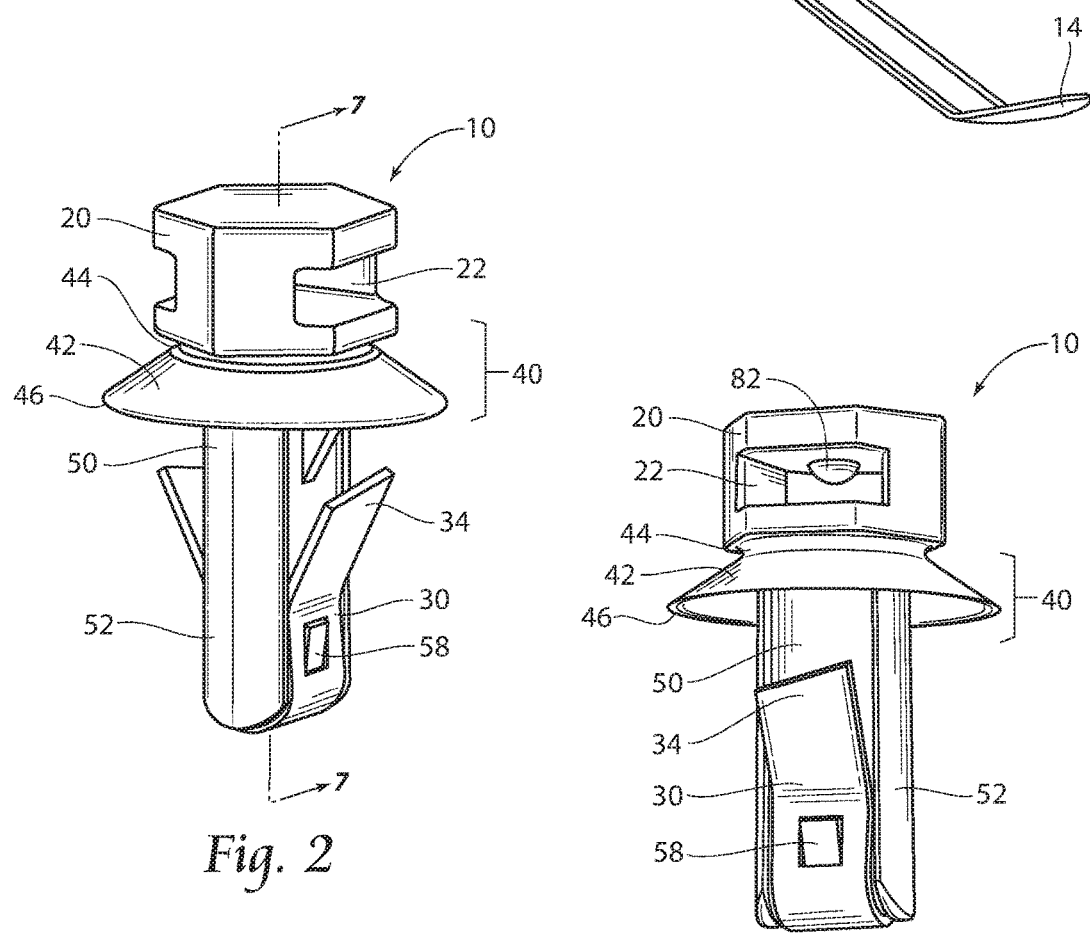
FIG. 2 is a perspective view of the assembly illustrated in FIG. 1.
Figure 3:
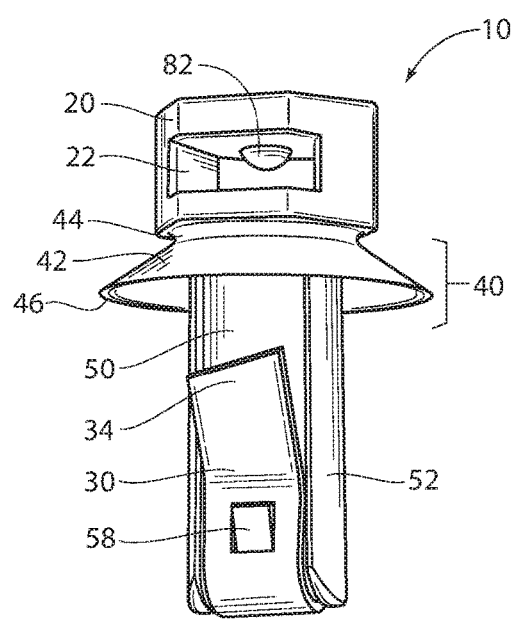
FIG. 3 is another perspective view of the assembly illustrated in FIGS. 1 and 2.

FIGS. 2 and 3 are perspective views of the mounting assembly 10. As illustrated, the mounting assembly 10 may include a mount member 18 having a head portion 20, a spring section 40 located below the head portion 20 of the mounting assembly 10, and a mounting section 50 extending downwardly from the head portion 20 and the spring section 40. A mount member 18 for use in the present assembly 10 may be molded of plastic, nylon or the like. Each of these sections will be described in more detail with respect to the following figures.

As seen, the head 20 portion may include a slot 22. As shown in FIG. 1, the slot 22 is adapted to receive a tie 12. The slot 22 may include an abutment 82, which provides frictional force for the flexible tie 12 when the flexible tie tail 14 is inserted in the slot 22 during bundling. The head portion 20 may further provide support for a bundle 80 while the tie 12 is secured to the assembly 10 through the slot 22. The spring section 40 and the mounting section 50 extend from the head portion 20.

Referring to FIGS. 2 and 3, the spring section 40 is generally comprised of a flexible disk or diaphragm spring 42. As seen, the diaphragm spring 42 preferably extends downwardly from the head portion 20. The diaphragm spring 42 tapers downwardly and outwardly from a first end 44 located at the head portion 20 to a second end 46. The diaphragm spring 42 is shown as being circular or conical. However, the shape and structure may be of any arrangement that will provide the necessary resistance for the spring section 40. For instance, the diaphragm spring 42 may consist of a pyramidal shape of any number of sides, which may or may not have each of the sides connected to an adjoining side.

Referring now to FIGS. 7-10, the mounting section 50 may be seen as comprised primarily of a stud portion 52, having a proximal end 54A located adjacent the spring section 40, and a distal end 54B located opposite the proximal end 54A. The stud portion 52 extends downwardly from the head portion 20. The stud portion 52 also may be considered to extend downwardly from the spring section 40. However, the spring section 40 may be arranged so that it surrounds the proximal end 54A of the stud portion 52 and the stud portion 52 does not actually depend from the spring section 40 or the diaphragm spring 42. Either arrangement should not be considered limiting on the invention, and both would fall within the scope of the invention.

Figure 4:
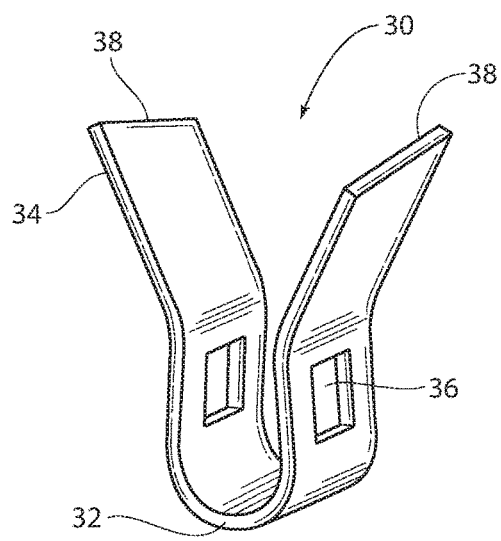
FIG. 4 is a perspective view of a clip member for use with the assembly illustrated in FIGS. 1-3.
Figure 5:
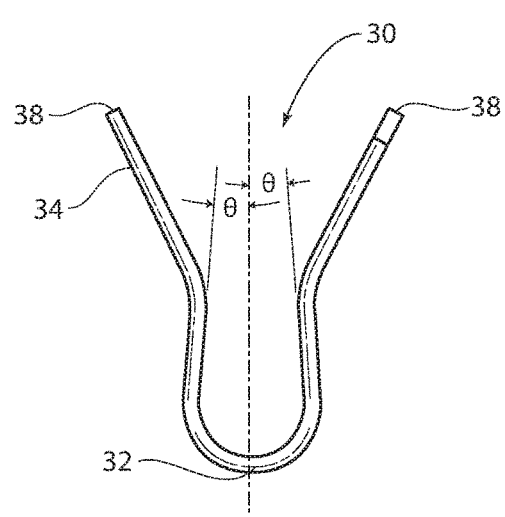
FIG. 5 is a front view of the clip member illustrated in FIG. 4.
Figure 6:
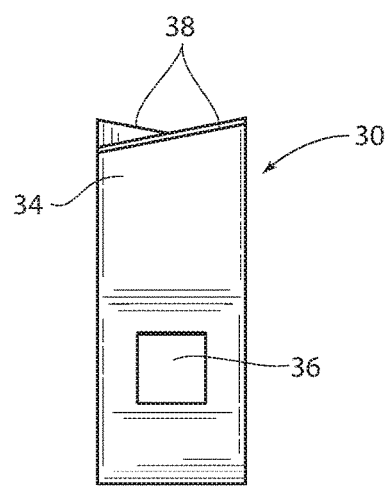
FIG. 6 is a side view of the clip member illustrated in FIG. 4.
Figure 7:
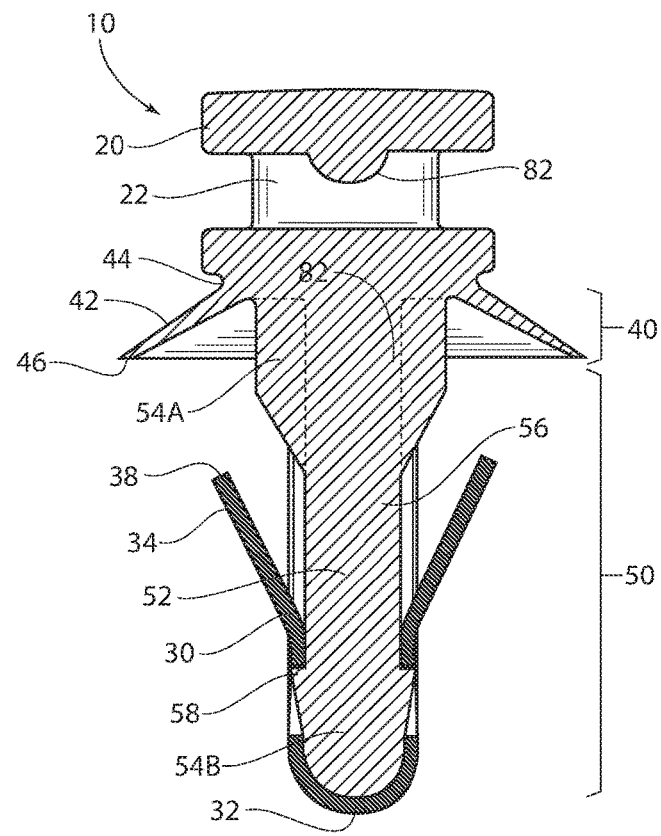
FIG. 7 is a cross section view of the mounting assembly illustrated in FIG. 2 and taken along lines 7-7 thereof.

With reference to FIGS. 2-7, the stud portion 52 includes a center section 56 substantially coextensive with the lengthwise dimension of the stud portion 52. The center section 56 is adapted for coupling engagement with a clip member 30. A clip member 30 for use with the described assembly 10 may be fabricated of any rigid metal sufficient to withstand pull out force. As seen in the views of FIGS. 4-6, a clip member 30 for use with the mounting assembly 10 includes an arcuate portion 32 having a pair of extending arms 34. The arms 34 are preferably angled to extend away from the center section 56 when in place on the stud portion 52 (see FIG. 7). The clip member 30 may further include at least one attachment window 36. The window 36 is adapted to engage a ramp 58 located on the stud 52 to thereby secure the clip member 30 to the stud portion 52. Further, and as seen in FIG. 6, the arms 34 of the clip member 30 may each include a distal end 38. As illustrated, the distal ends 38 may be angled for engagement with a support member 100, as will be discussed.

Figure 8:
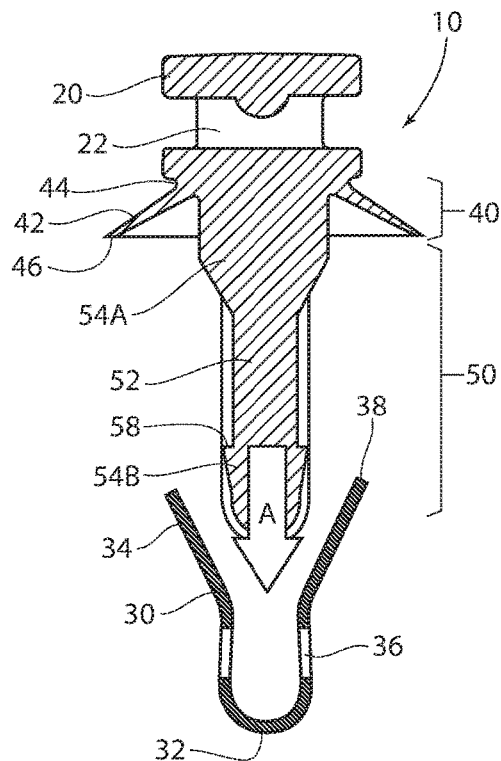
FIG. 8 is a view similar to that of FIG. 7 but showing the clip member detached from the mount member.
Figure 9:
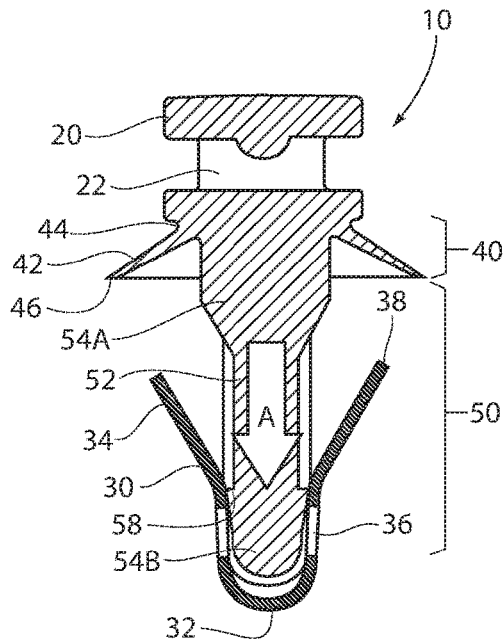
FIG. 9 is a view similar to that of FIGS. 7 and 8 but showing the clip member being installed on the stud portion of the mount member.
Figure 10:
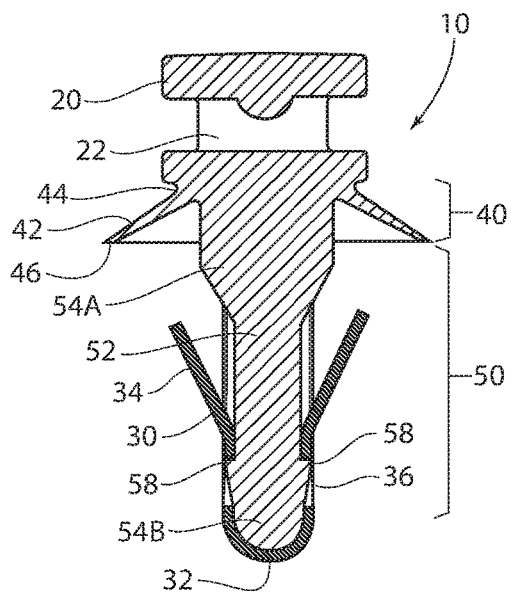
FIG. 10 is a view similar to that of FIGS. 7-9 but showing the clip member and the mount member joined with the assembly ready for use.

The views of FIGS. 8-10 illustrate a method of affixing the clip member 30 to the stud portion 52 of the mount member. As shown, the stud portion 52 is moved in the direction arrow A until the ramp 58 slides into the window 36 of the clip member 30. Once the ramp 58 is engaged in the window 36, as is seen in FIG. 10, the clip member 30 is secured to the stud portion 52 and resists separation from the mount member.

Figure 11:
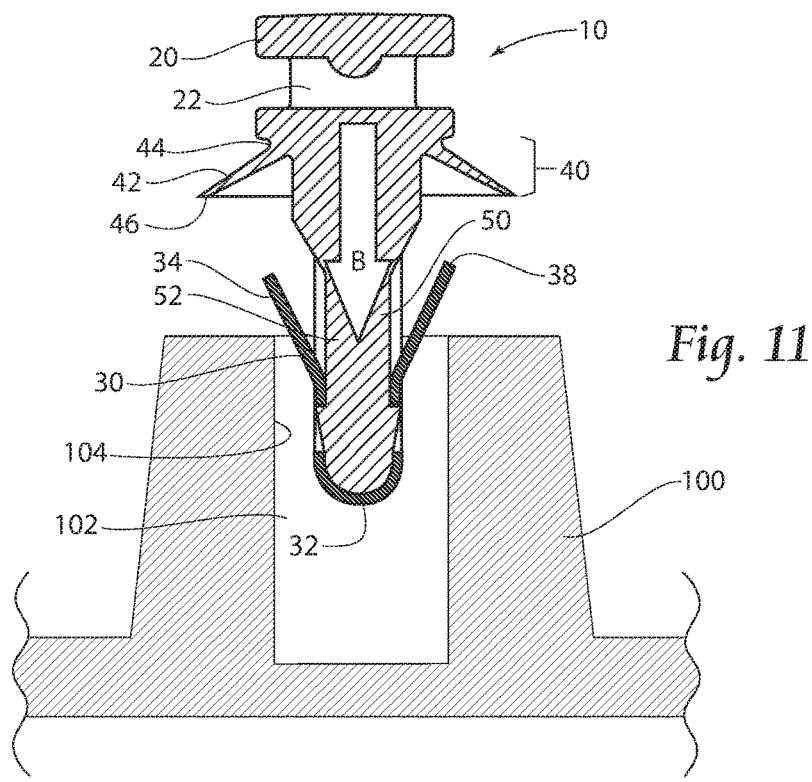
FIG. 11 is a view similar to that of FIG. 10 but showing the assembly being positioned for use in a reentrant bore.
Figure 12:
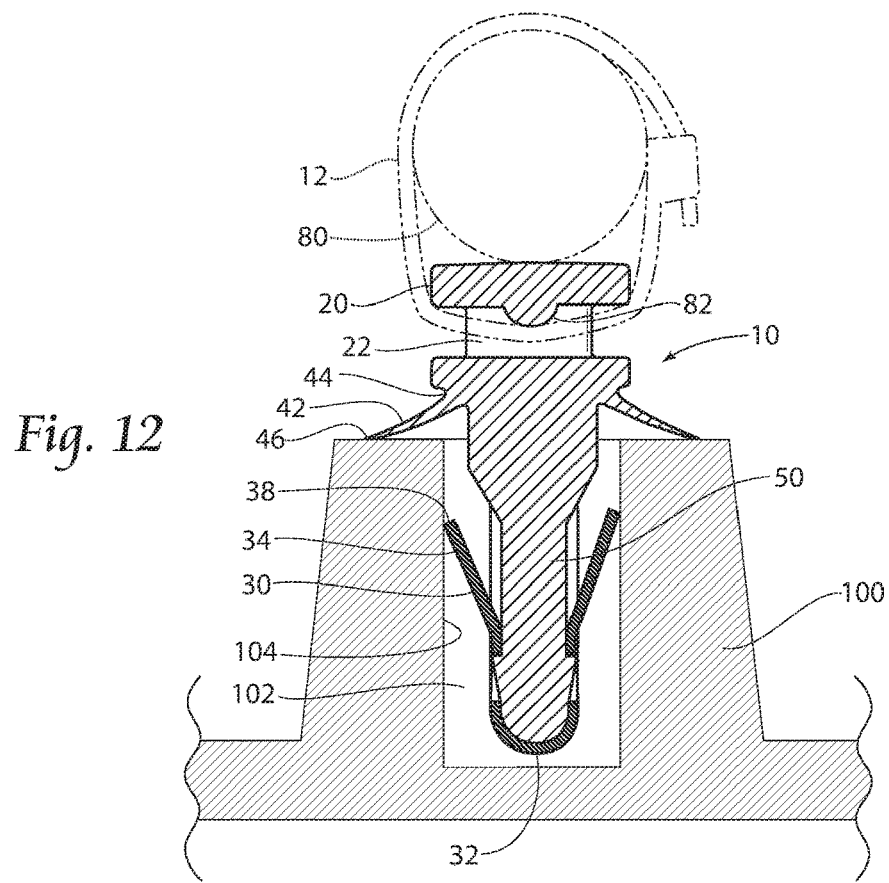
FIG. 12 is a view similar to that of FIG. 11 but showing the assembly positioned in a reentrant bore and ready for use.
Figure 13:
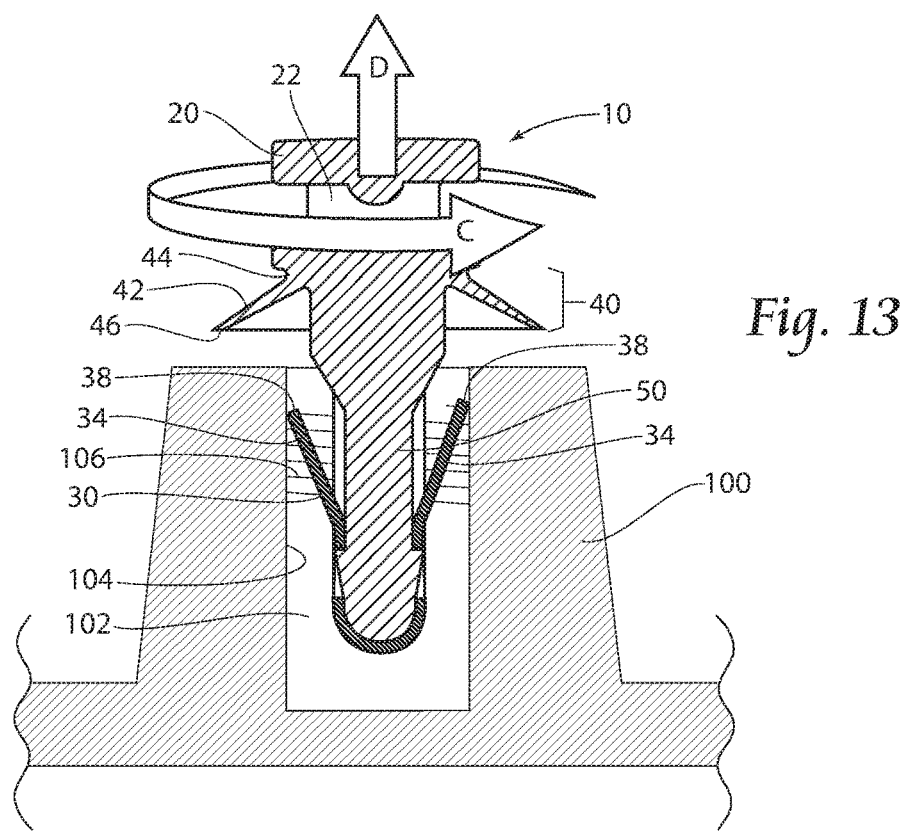
FIG. 13 is a view similar to that of FIG. 12 but showing the assembly being removed from the reentrant bore.

FIGS. 11-13 depict a method of using the assembly 10 illustrated in FIGS. 1-10. As is shown, the assembly 10 is moved in the direction of arrow B and into a reentrant bore 102 in a support, member 100. When the assembly 10 is firmly affixed, as is shown in FIG. 12, and when the stud portion 52 is inserted into the reentrant bore 102, the diaphragm spring 42 provides a sufficient area so that it may flex against the support surface 100 and provide a tight fitting arrangement for the mounting assembly 10. As previously stated, the diaphragm spring 42 is shown as circular, but it should be understood that any flexible geometric design or shape is capable of acting as the diaphragm spring 42. As is further seen, the arms 34 of the clip member 30 engage the walls 104 of the bore 102 to resist pull out. FIG. 13 illustrates a method of withdrawing the assembly 10 from a bore 102. As shown, while the assembly 10 is rotated in the direction of arrow C, the distal ends 38 of the arms 34 create threading 106 on the walls 104 of the reentrant bore 102. The distal ends 38 of the arms 34 ride on the threading 106, and the device 10 moves out of the bore 102 in the direction of arrow D.

Figure 14:
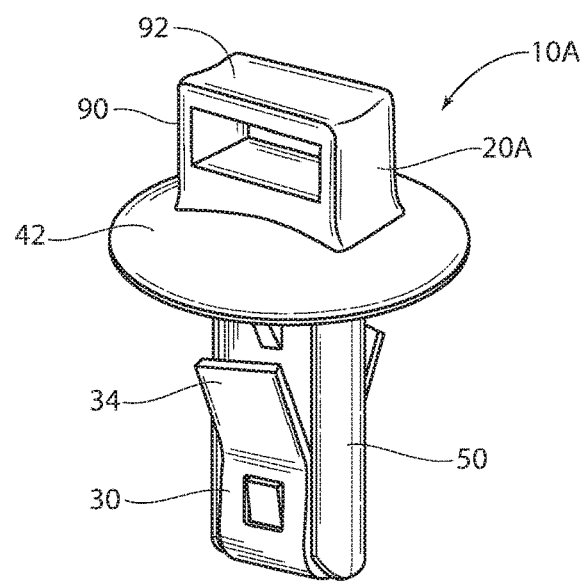
FIG. 14 is a perspective view of another assembly according to the present invention and showing a clip element and an alternative mount element.

FIG. 14 shows another embodiment of the assembly 10A. As illustrated, the head portion 20A of the mounting assembly 10A may include an integrally formed saddle mount 90 having an object support surface 92, a spring section 40 located below the support surface 92, and a mounting section 50 extending downwardly from the support surface 92 and the spring section 40.

FIGS. 15-27 illustrate another embodiment of a mounting assembly 10B according to the present invention. As in the previously described embodiments, the device 10B shown in these views is adapted to interact with an elongated tie 12 having a tie tail 14 and a tie head 16 for use in wrapping and securing around an elongate bundle 80 (see FIG. 12), and to thereby secure the bundle 80 to the mounting assembly 10B, which is in turn secured to a support surface 100 (see FIGS. 25-27). As in the previous embodiments, a bundle 80 for use with the present device may consist of a single object or several objects, such as wires, cables, hoses, tubing, or other elongated articles. Likewise, the bundle 80 may be of various sizes and yet be accommodated by the assembly 10B.

FIGS. 16 and 17 are perspective views of the mounting assembly 10B. As illustrated, and similar to the previous embodiments, the mounting assembly 10B may include a mount member having a head portion 20B, a spring section 40 located below the head portion 20B of the mounting device 10B, and a mounting section 50 extending downwardly from the head portion 20B and the spring section 40. As seen, the head portion 20B may include a slot 22 adapted to receive a tie 12 (see FIG. 15). The slot 22 may include an abutment 82, which provides frictional force for the flexible tie 12 when the flexible tie tail 14 is inserted in the slot 22. The head portion 20B may further provide support for a bundled bundle 80 while the tie 12 is secured to the device 10 through the slot 22, and may include a groove 24 for use by a screwdriver (not shown), or other flat blade tool. The spring section 40 and the mounting section 50 extend from the head portion 20B.

Referring to FIGS. 16 and 17, and as mentioned with regard to the previous embodiment, the spring section 40 is generally comprised of a flexible disk or diaphragm spring 42. The diaphragm spring 42 preferably extends downwardly from the head portion 20A and downwardly and outwardly from a first end 44 located at the head 20B to a second end 46. As in the previous embodiment, while the diaphragm spring 42 shown with regard to FIGS. 15-27 is depicted as being circular or conical, the shape and structure may be of any arrangement that will provide the necessary resistance for the spring section 40.

Referring now to FIGS. 21-24, the mounting section 50 may be seen as comprised primarily of a stud portion 52A, having a proximal end 54A located adjacent the spring section 40, and a distal end 54B located opposite the proximal end 54A. The stud portion 52A extends downwardly from the head portion 20B. The stud portion 52A may also be considered to extend downwardly from the spring section 40. However, the spring section 40 may be arranged so that it surrounds the proximal end 54A of the stud portion 52A and the stud portion 52A does not actually depend from the spring section 40 or the diaphragm spring 42. Either arrangement should not be considered limiting on the invention.

Figure 18:
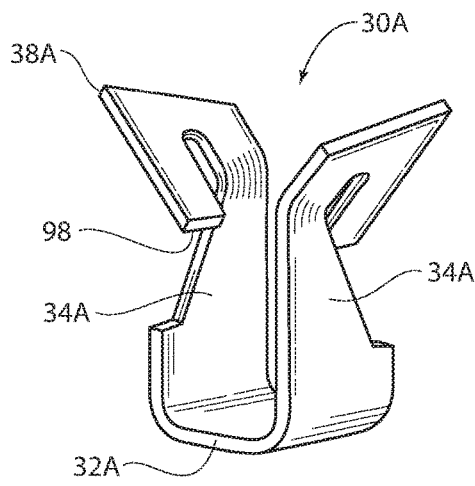
FIG. 18 is a perspective view of a clip member for use with the assembly illustrated in FIGS. 15-17.
Figure 19:
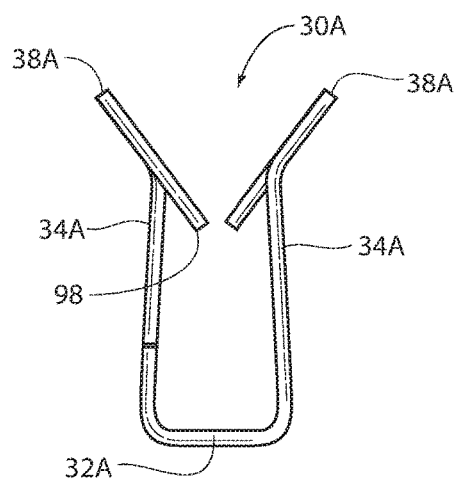
FIG. 19 is a front view of the clip member illustrated in FIG. 18.
Figure 20:
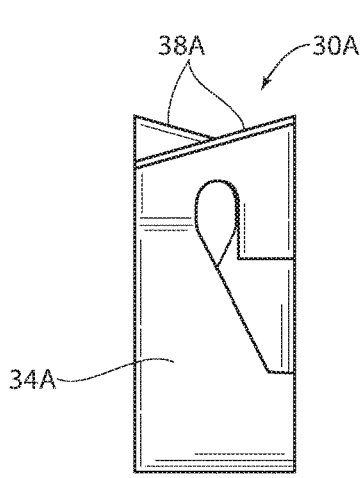
FIG. 20 is a side view of the clip member illustrated in FIG. 18.
Figure 21:
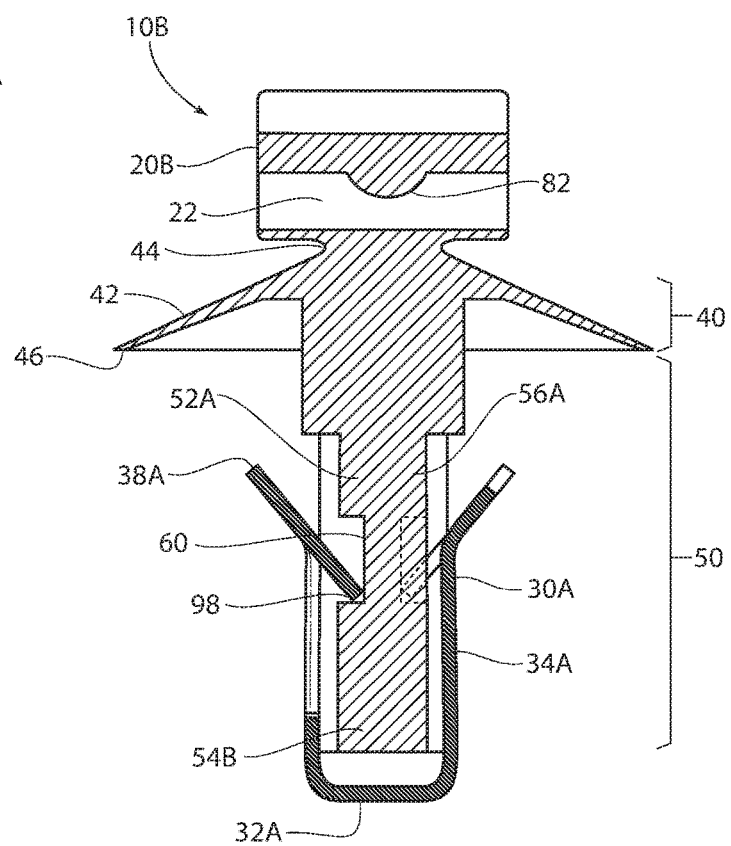
FIG. 21 is a cross section view of the assembly illustrated in FIG. 16 and taken along lines 21-21 thereof.

With reference to FIGS. 16-21, the stud portion 52A includes a center section 56A substantially coextensive with the lengthwise dimension of the stud portion 52A. The center section 56A is adapted for coupling engagement with a clip member 30A. As seen in the views of FIGS. 18-20, a clip member 30A for use with the mounting assembly 10B includes an arcuate portion 32A having a pair of extending arms 34A. As seen particularly in FIGS. 18 and 19, the arms 34A may each include a barbed portion 98. The barbed portion 98 is adapted to engage a cut out portion 60 located on the stud portion 52A to thereby secure the clip member 30A to the stud portion 52A. The arms 34A may also include an angled distal end 38A, and as is seen in FIG. 20. The angled distal end 38 aids in engagement with a support member 100.

Figure 22:
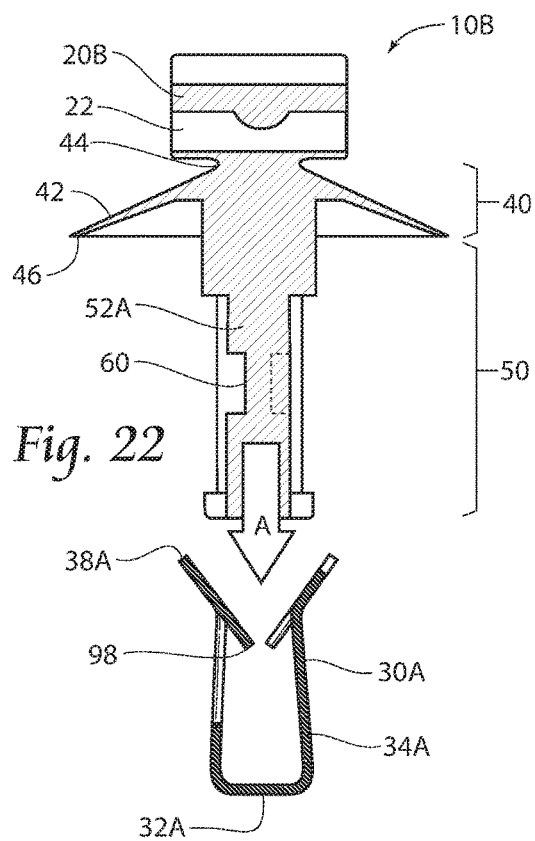
FIG. 22 is a view similar to that of FIG. 21 but showing the clip member detached from the mount member.
Figure 23:
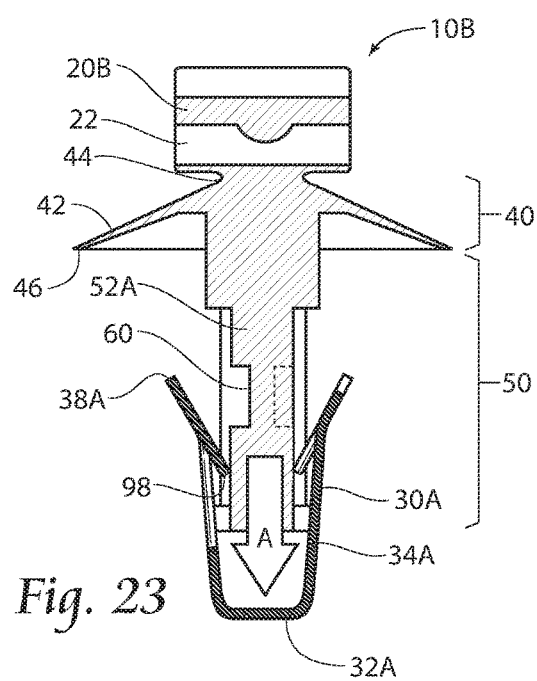
FIG. 23 is a view similar to that of FIGS. 21 and 22 but showing the clip member being installed on the mount member.
Figure 24:
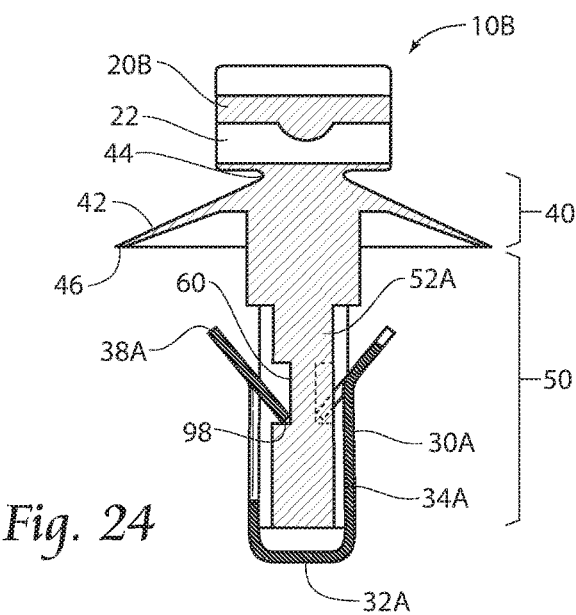
FIG. 24 is a view similar to that of FIGS. 21-23 but showing the clip member and the mount member joined, with the assembly ready for use.

The views of FIGS. 22-24 illustrate a method of affixing the clip member 30A to the stud portion 52A of the mount member. As shown, the stud portion 52A is moved in the direction arrow A until the barbed portion 98 slides into the cut out portion 60 of the stud portion 52A of the mount member. Once the barbed portion 98 is seated in the cut out portion 60, as is seen in FIG. 24, the clip member 30A is secured to the stud 52A of the mount member and resists separation therefrom.

Figure 25:
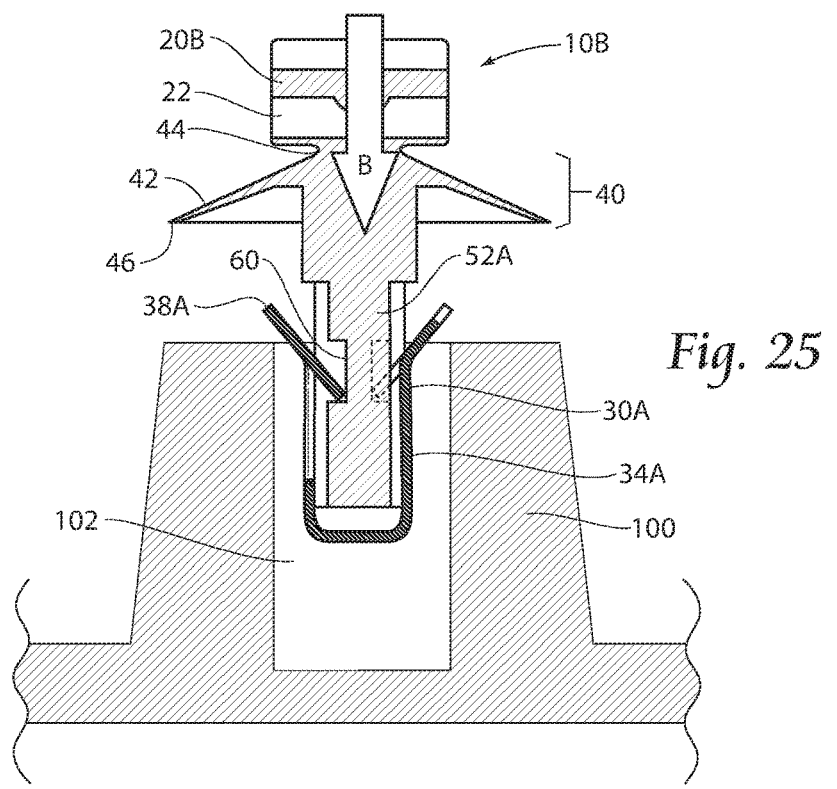
FIG. 25 is a view similar to that of FIG. 24 but showing the mounting assembly being positioned for use in a reentrant bore.
Figure 26:
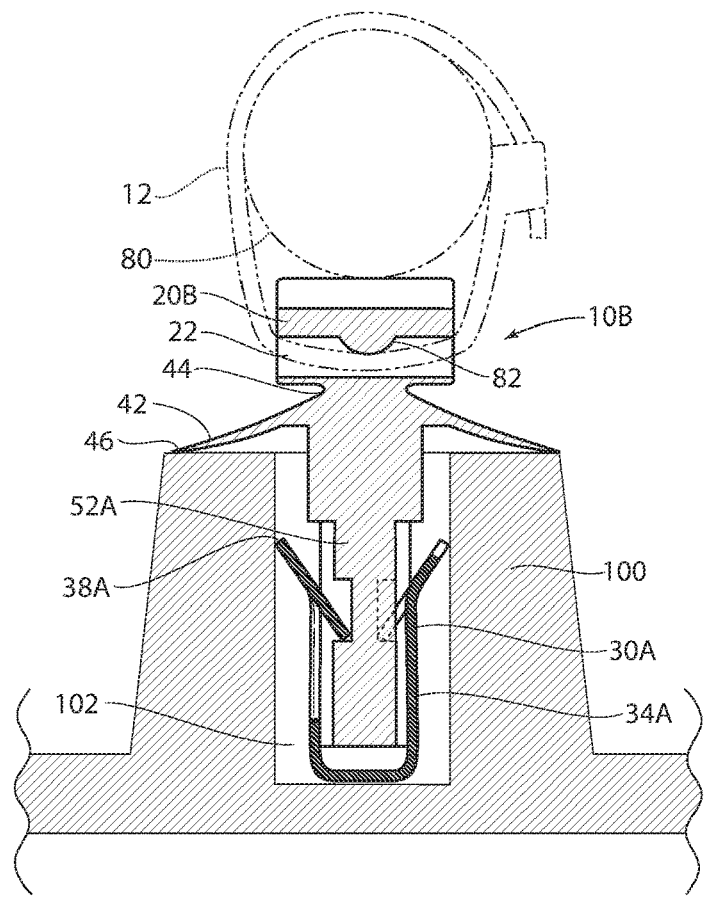
FIG. 26 is a view similar to that of FIG. 25 but showing the mounting assembly positioned in a reentrant bore and ready for use.
Figure 27:
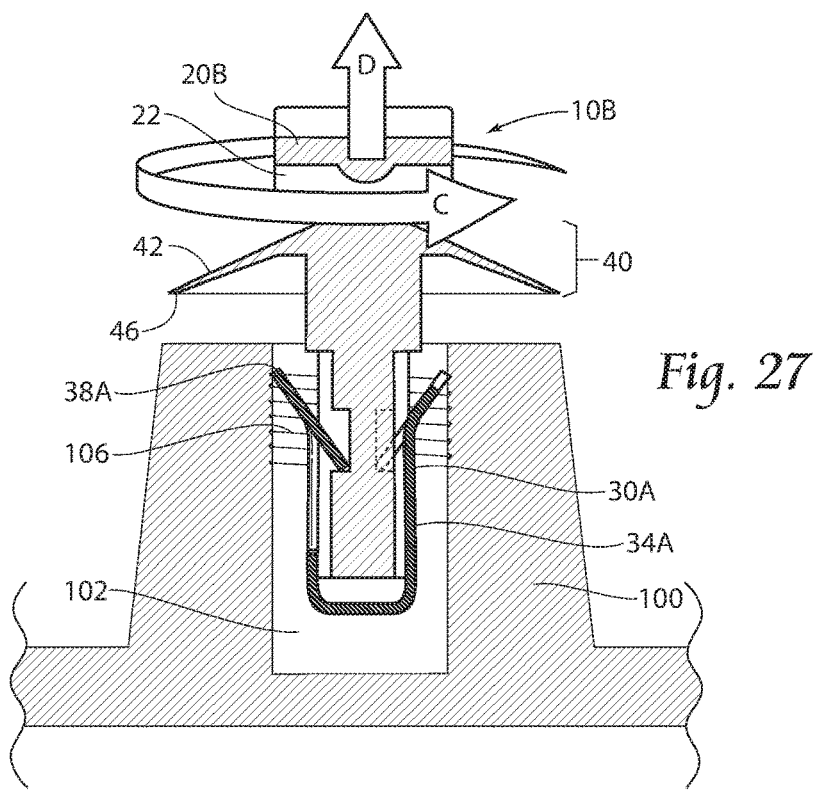
FIG. 27 is a view similar to that of FIG. 26 but showing the mounting assembly being removed from the reentrant bore.

FIGS. 25-27 depict a method of using the assembly 10B illustrated in FIGS. 15-24. As is shown, the assembly 10B is moved in the direction of arrow B and into a reentrant bore 102 in a support member 100. With the assembly 10B firmly affixed, as is shown in FIG. 26, and when the stud portion 52A is inserted into the reentrant bore 102, the diaphragm spring 42 provides a sufficient area so that it may flex against the support surface 100 and provide a tight fitting arrangement for the mounting assembly 10B. As previously stated, the diaphragm spring 42 is shown as circular, but it should be understood that any flexible geometric design or shape is capable of acting as the diaphragm spring 42. Moreover, the distal ends 38A of the clip member 30A arms 34A engage the walls 104 of the bore 102 to resist pull out. As shown in FIG. 27, the assembly 10B may be used in reentrant bores 102. FIG. 27 illustrates a method of withdrawing the assembly 10B from a bore 102. As seen, and similar to previous embodiments, while the device 10B is rotated in the direction of arrow C, the distal ends 38A of the arms 34A create threading 106 on the walls 104 of the reentrant bore 102. The distal ends 38A of the arms 34A ride on the threading 106, and the device 10B moves out of the bore 102 in the direction of arrow D.

Figure 28:
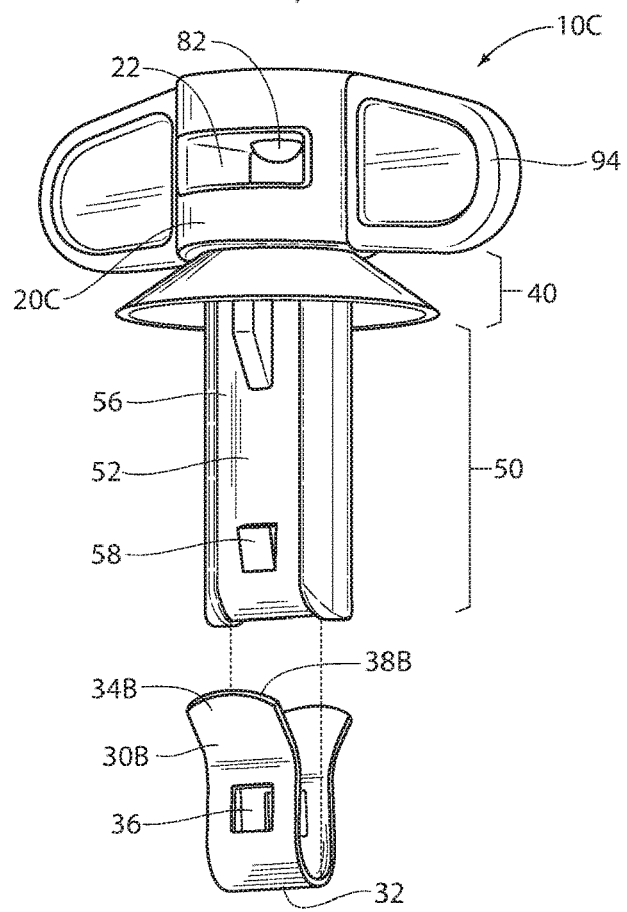
FIG. 28 is an exploded view of another mounting assembly according to the present invention and showing an alternative clip member and an alternative head portion.

FIG. 28 is an exploded view of another mounting assembly 10C according to the present invention and showing an alternative clip member 30B and an alternative head portion 20C of the mount member. As shown, the head portion 20C includes at least one laterally extending wing member 94 for ease in manipulation during use. As in the previously described embodiments, the assembly 10C illustrated in FIG. 28 is adapted to interact with an elongated tie 12 for use in wrapping and securing around an elongate bundle 80 (see FIG. 12), and to thereby secure the bundle 80 to the mounting assembly 10C, which is in turn, secured to a support surface 100 (see FIGS. 25-27, for example). Moreover, the mounting assembly 10C may include a spring section 40 located below the head portion 20C of the mount member, and a stud portion 52 extending downwardly from the head portion 20C and the spring section 40. As in previous embodiments, the head portion 20C may include a slot 22 adapted to receive a tie 12 (see FIG. 15). A stud portion 52 having a center section 56 is adapted for coupling engagement with a clip member 30B. The clip member 30B in this view includes an arcuate portion 32 having a pair of extending arms 34B which are preferably angled to extend away from the center section 56 and include rounded distal ends 38B. As in the embodiment illustrated in FIGS. 1-13, the clip member 30B of this view may further include at least one attachment window 36 adapted to engage a ramp 58 located on the stud portion 52 to thereby secure the clip member 30 to the stud 52 of the mount member.

Figure 29:
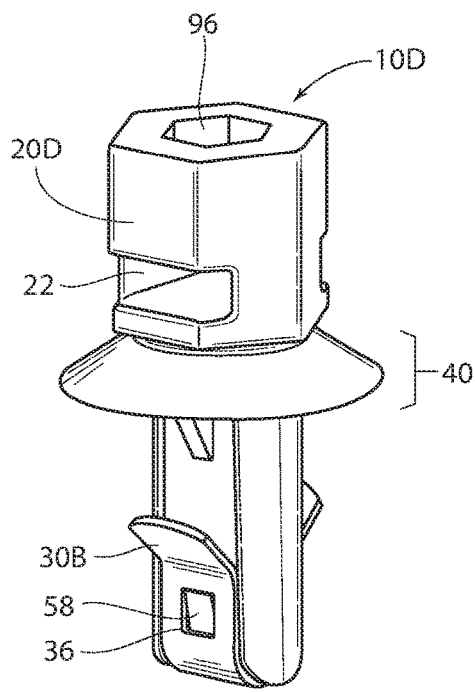
FIG. 29 is a perspective view of another mounting assembly according to the present invention and showing the clip member illustrated in FIG. 28 with a mount member having an alternative head portion.

FIG. 29 is a perspective view of another mounting assembly 10D according to the present invention showing the clip member 30B as illustrated in FIG. 28 but with an alternative head portion 20D. As shown, the head portion 20D may have a hexagonal profile and include a hexagonal recess 96 to receive an Allen wrench (not shown) or other tool.

Figure 30:
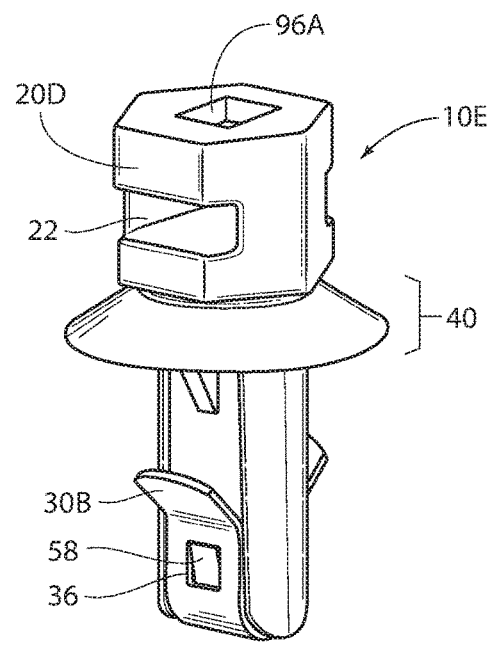
FIG. 30 is a perspective view of another mounting assembly according to the present invention and showing the clip member illustrated in FIG. 28 and a mount member having an alternative head portion.

FIG. 30 is a perspective view of another mounting assembly 10E according to the present invention, showing the clip member 30B illustrated in FIGS. 28 and 29, but having an alternative head portion 20E. As shown, the head portion 20D may have a hexagonal profile and further include a square recess 96A to receive a socket (not shown) or other tool.

Figure 31:
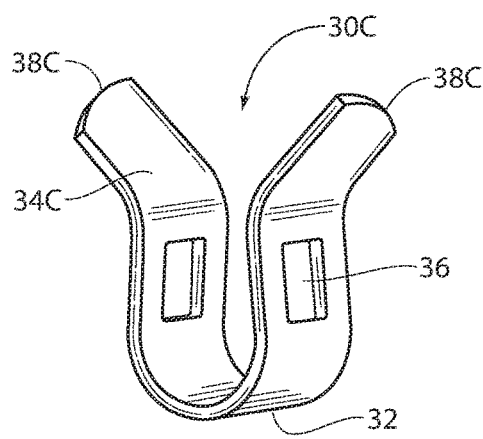
FIG. 31 is a perspective view of another clip member for use with the mounting assembly.
Figure 32:
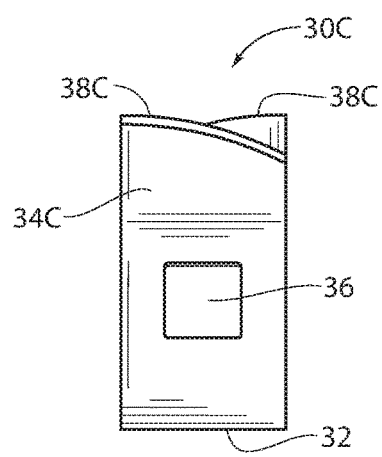
FIG. 32 is a side view of the clip member illustrated in FIG. 31.

FIGS. 31 and 32 illustrate another clip member 30C for use with mounting assemblies 10, 10A, 10C, 10D, 10E, or other mounting device having a stud portion 52 including a center section 56 with a ramp 58. The ramp 58 is adapted to engage a window 36 on the clip member 30C. As seen, the clip member 30C in these views includes an arcuate portion 32 having a pair of extending arms 34C which are preferably angled to extend away from the center section 56. The arms 34C each include curved distal ends 38C. As in previous embodiments, the clip member 30C may further include at least one attachment window 36 adapted to engage a ramp 58 located on a stud 52 to thereby secure the clip member 30C to the stud portion 52. As seen in FIG. 32, the distal ends 38C of the arms 34C include an angled contour for engagement with a support member 100, and self threading during removal.

The views of FIGS. 33-46 illustrate another embodiment of a mounting assembly 10F according to the present invention. Similarly to the previously described embodiments, the mounting assembly 10F of these views is arranged to interact with an elongated tie 12 to wrap and secure an elongate bundle 80 (shown in phantom in FIG. 39A). The mounting assembly 10F may be secured to a support member 100 having a reentrant bore 102 (see FIGS. 38-44). It is to be understood that as in previous embodiments a bundle 80 for use with the mounting assembly 10F may consist of a single object or several objects, such as wires, cables, hoses, tubing, or other elongated articles. Further, a bundle 80 may comprise a bundle of individual wires or cables, rigid or flexible conduit, hot or cold fluid transporting tubes, or hoses. The bundle 80 may also be contained within the bore of a conventional tubular conduit. Likewise, the bundle 80 may be of various sizes and yet be accommodated by the assembly 10F.

Figure 33:
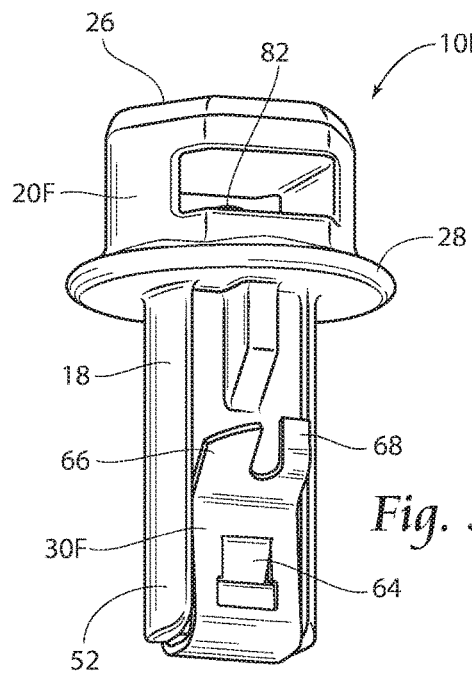
FIG. 33 is a perspective view of another mounting assembly according to the present invention and showing an alternative clip member and a mount member having an alternative head portion.
Figure 34:
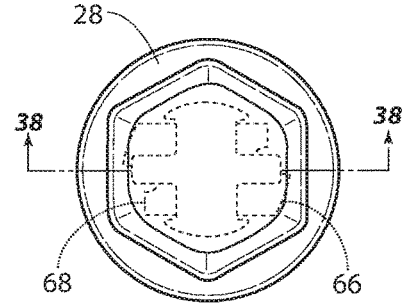
FIG. 34 is a top view of the assembly illustrated in FIG. 33, and showing the stud portion and clip member in phantom.

FIG. 33 is a perspective view of the mounting assembly 10F. As illustrated, the mounting assembly 10F may include a mount member 18 and a clip member 30F. The mount member 18 includes a head portion 20F and a mounting section 50 extending downwardly from the head portion 20F. As seen, the head portion 20F preferably includes a slot 22 adapted to receive a tie 12, as described above and as shown in FIG. 39A. As further shown, the head portion 20F may include a top surface 26 arranged to support a bundle 80 while a tie 12 is secured through the slot 22, and a circumferentially extending flange 28. The head portion 20F may have a generally hexagonal profile, as best seen in FIG. 34, but it is within the scope of the present invention to provide the head portion 20F with other profile characteristics, including a spring section 40 (not shown in these views), as may be desired.

Figure 35:
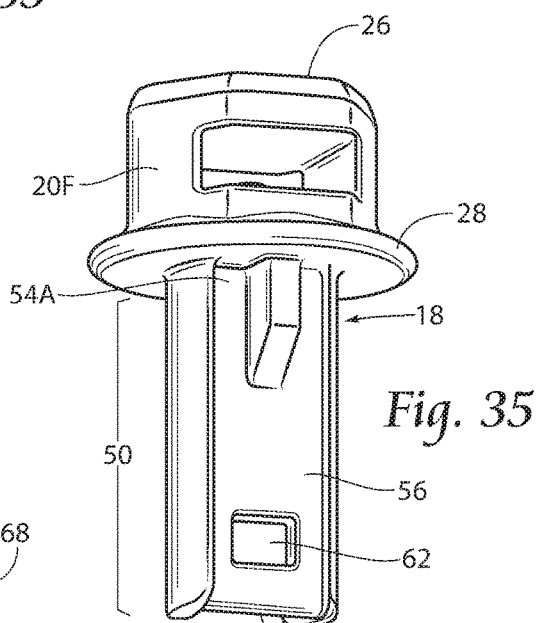
FIG. 35 is a perspective view of the mount member illustrated in FIG. 33.

With particular attention to FIG. 35, the mounting section 50 of the mount member 18 may be seen as comprised primarily of a stud portion 52, having a proximal end 54A located adjacent the head portion 20F, and a distal end 54B located opposite the proximal end 54A. The stud portion 52 extends downwardly from the head portion 20F. The stud portion 52 also may be considered to extend downwardly from the flange 28; however, the flange 28 may be arranged so that it surrounds the proximal end 54A of the stud portion 52 and the stud portion 52 does not actually depend from the flange 28. Neither arrangement should be considered limiting on the invention, and both fall within the scope of the invention. With further reference to FIG. 35, the stud portion 52 includes a center section 56 substantially coextensive with the lengthwise dimension of the stud portion 52. The center section 56 preferably includes a mount aperture 62 adapted for coupling engagement with a clip member 30F, as will be discussed.

Figure 36:
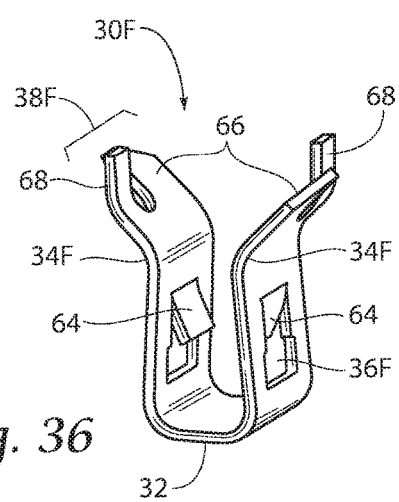
FIG. 36 is a perspective view of the clip member illustrated in FIG. 33.
Figure 37:
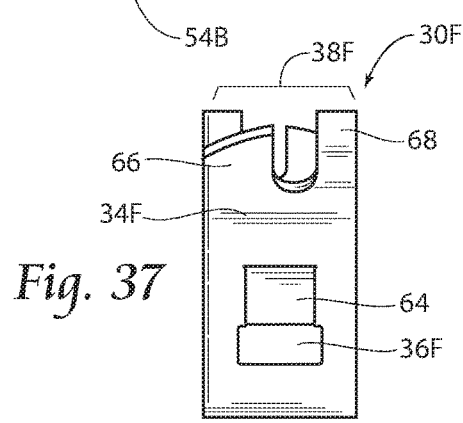
FIG. 37 is a side view of the clip member illustrated in FIG. 36.
Figure 40:
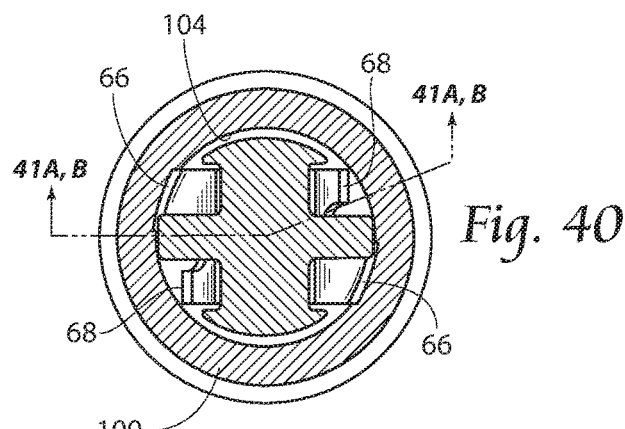
FIG. 40 is a cross sectional view of the assembly taken along lines 40-40 of FIG. 39A.
Figure 41A:
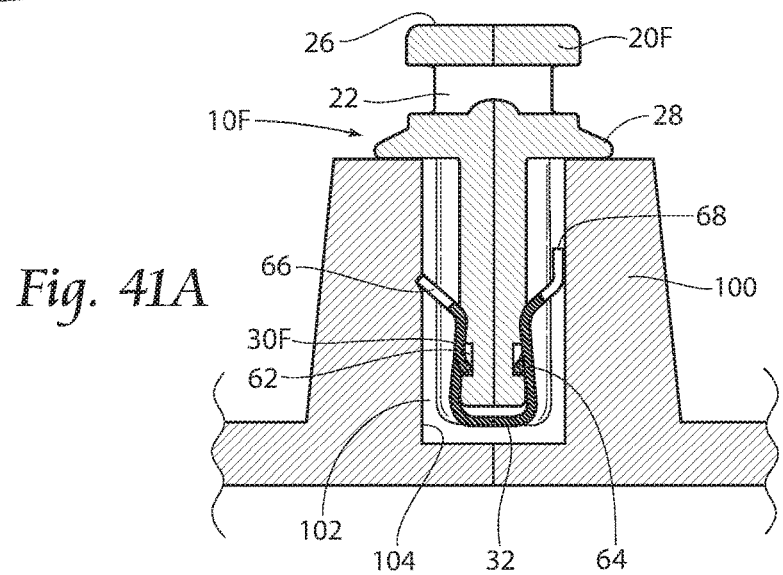
FIG. 41A cross sectional view of the assembly taken along lines 41A, B-41A, B of FIG. 40.
Figure 41B:
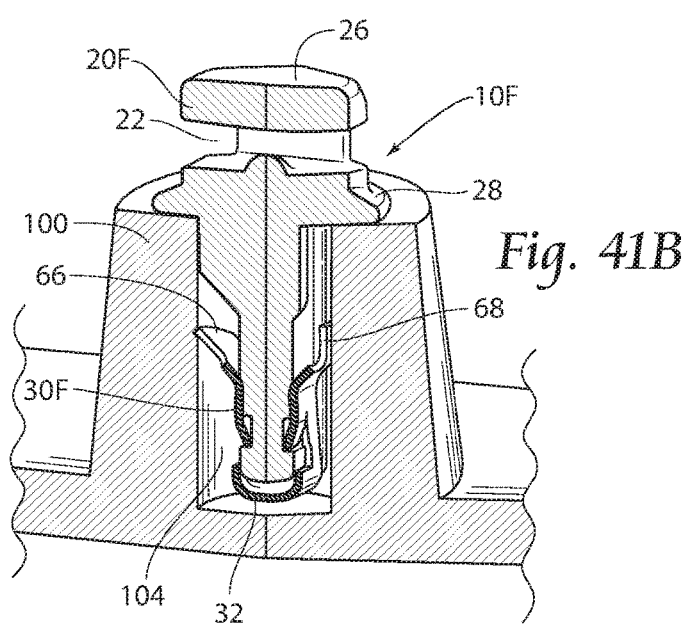
FIG. 41B is a perspective section view of the assembly taken along lines 41A, B-41A, B of FIG. 40.

A clip member 30F for use with the mounting assembly 10F may be seen particularly in the views of FIGS. 36 and 37. As illustrated, the clip member 30F includes an arcuate portion 32 having a pair of extending arms 34F. The arms 34F are preferably angled to extend away from the center section 56 when in place on the stud portion 52 (see FIG. 33). The clip member 30F may further include at least one attachment window 36F having an inwardly angled locking tab 64. The window 36F and locking tab 64 are arranged to engage the mount aperture 62 located on the stud portion 52 to thereby secure the clip member 30F to the stud portion 52 and to resist separation of the parts 30F, 52 during use. Further seen in FIGS. 36 and 37, each arm 34F of the clip member 30F includes a bifurcated distal end 38F. As illustrated, each distal end 38F includes a penetrating tooth 66 and a limiting shoulder 68. The penetrating tooth 66 may be angled for engagement with a support member 100, while the limiting shoulder 68 is canted in a relatively upright position, as will be discussed.

FIGS. 38-45, depict a method of using the assembly 10F illustrated in FIGS. 33-37. As is shown in FIG. 38, the assembly 10F is moved in the direction of arrow B and into a reentrant bore 102 in a support member 100. FIGS. 39A, 39B illustrate the assembly 10F firmly affixed with the stud portion 52 inserted into the reentrant bore 102. As shown in phantom in FIG. 39A, a tie 12 may be passed through the slot 22 and around a bundle 80. The bundle is supported on the top surface 26 of the head portion 20F. Moreover, the views of FIGS. 39A-41B illustrate the penetrating tooth 66 and limiting shoulder 68 of each arm 34F of the clip member 30F engaging the walls 104 of the bore 102 to resist pull out during use. The penetrating tooth 66 digs into the walls 104 of the bore 102 a limited depth to thereby provide a predetermined retention strength. FIG. 39B further illustrates a bore 102A having an angled configuration.

Figure 42:
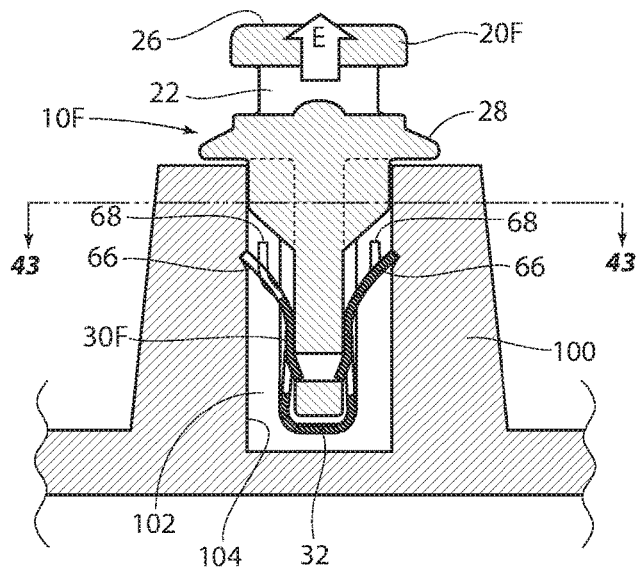
FIG. 42 is a cross sectional view similar to that of FIG. 39B, showing the mounting assembly being forcefully extracted from the reentrant bore.
Figure 43:
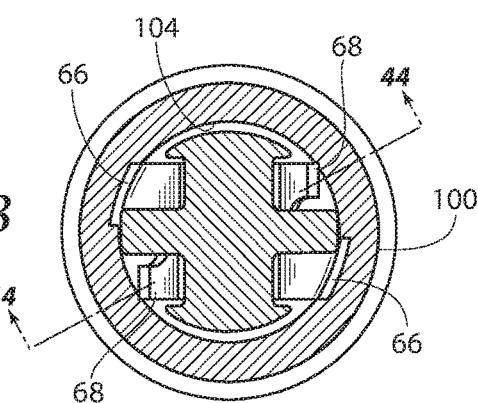
FIG. 43 is a cross sectional view of the mounting assembly shown in FIG. 42 and taken along lines 43-43 thereof.
Figure 44:
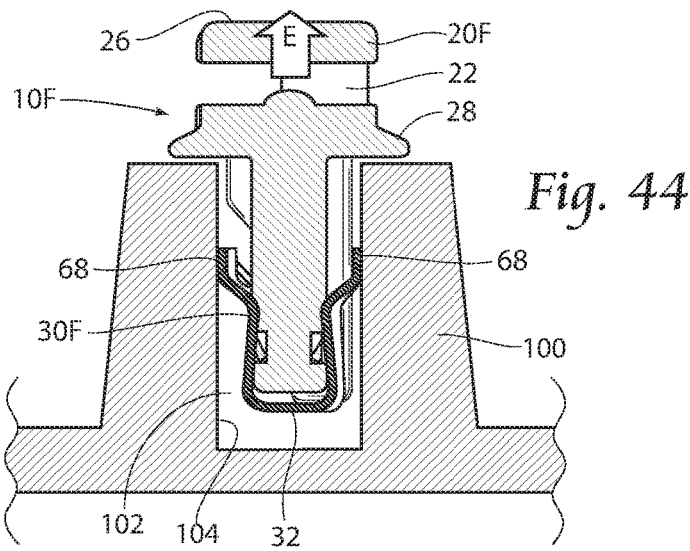
FIG. 44 is a cross sectional view similar to that of FIG. 42, but taken along lines 44-44 of FIG. 43.
Figure 45:
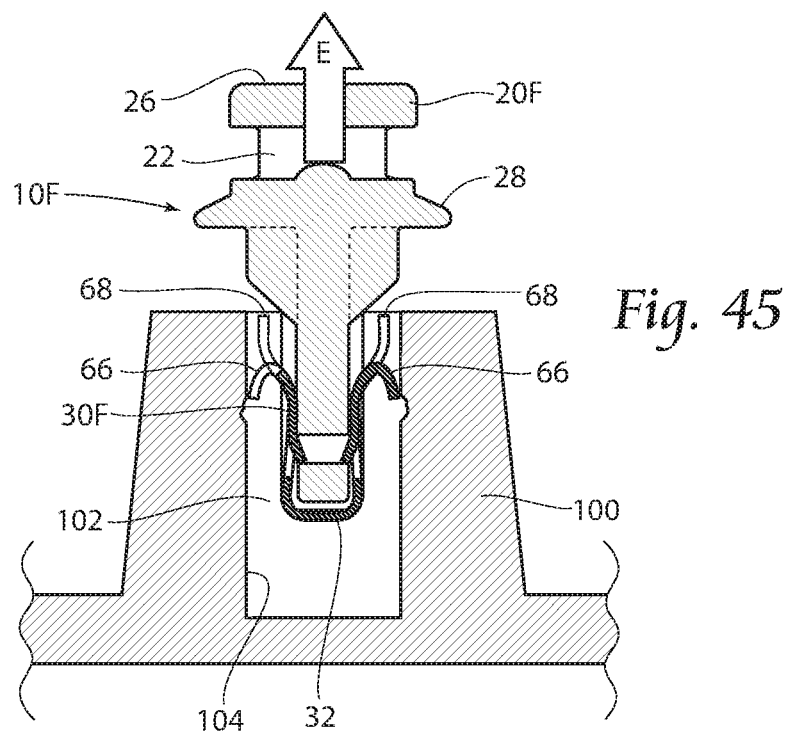
FIG. 45 is a cross sectional view similar to that of FIG. 42, showing further forceful extraction of the mounting assembly from the reentrant bore.

FIGS. 42-45 illustrate a method of forcefully withdrawing the assembly 10F from a bore 102 while maintaining integrity of the assembly 10F during extraction. As shown in the view of FIG. 42, the assembly 10F is pulled axially in the direction of arrow E and the penetrating tooth 66 of each arm 34F begins to deform outwardly against the bore 102 wall 104 to resist removal. The views of FIGS. 43 and 44 illustrate the action of extraction on the clip member 30F. As viewed, the limiting shoulder 68 also contacts the bore 102 wall 104 as does the deforming penetrating tooth 66. Continued forceful axial extraction is shown in FIG. 45. The view of FIG. 45 depicts further deformation of each penetrating tooth 66 as the predetermined retention strength is exceeded and each penetrating tooth 66 further penetrates into the bore 102 wall 104. The limiting shoulder 68 prevents the penetrating tooth 66 from further penetration into the bore 102 wall 104. At peak failure load, the penetrating tooth 66 bends, as is shown in FIG. 45, and full extraction of the assembly 10F from the bore 102 is allowed. The action of the limiting shoulder 68 to limit the depth the penetrating tooth 66 may penetrate the bore 102 wall 104 permits the assembly 10F to be successfully extracted from the bore 102 without risk of the clip member 30F separating from the stud portion 52.

Figure 46:
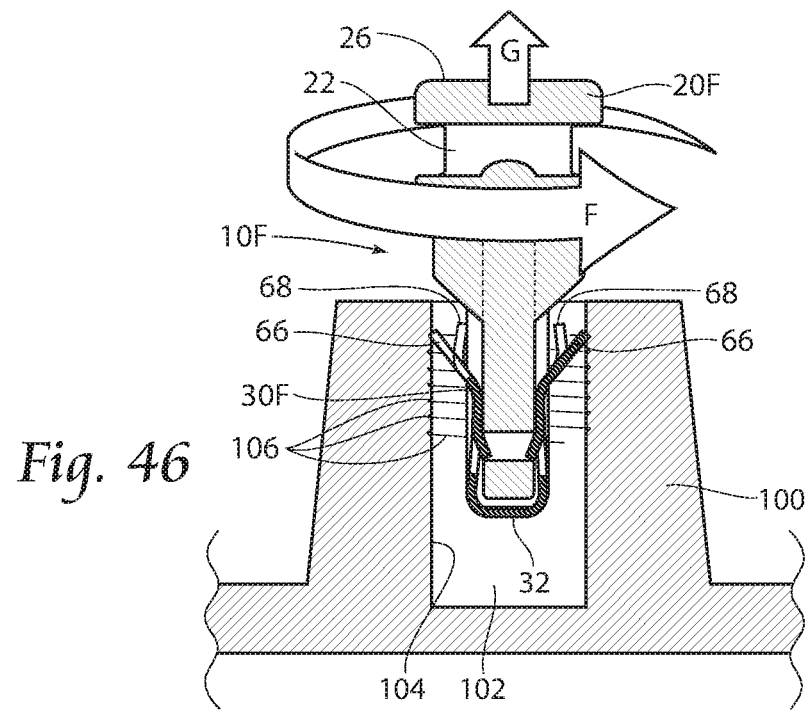
FIG. 46 is a cross sectional view illustrating rotational removal of the mounting assembly from the reentrant bore.

Another method of withdrawing the assembly 10F from a bore 102 may be seen in the view of FIG. 46. As shown, the assembly 10F is rotated in the direction of arrow F while penetrating tooth 66 of each arm 34F remains in contact with the walls 104 of the bore 102. This contact creates threading 106 on the walls 104 of the reentrant bore 102. Each penetrating tooth 66 rides on the threading 106, and the device 10F moves out of the bore 102 in the direction of arrow G.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention which is defined by the claims.

We claim:

1. A mounting assembly configured to retain an elongate member to a support surface defining a bore, said assembly comprising:
    a mount member formed of a polymer material having a head portion configured to contact the support surface and an elongate stud portion extending downwardly from said head portion configured to be received within the bore, wherein said head portion of said mount member includes a slot arranged to receive an elongate tie, a top surface arranged to support a bundle while said elongate tie is secured through the slot, and a circumferentially extending flange; and
    a clip member formed of a metallic material, attached to the stud portion, configured to be received within the bore with the stud portion, and defining an arcuate portion and a pair of extending arms, wherein each arm of said pair of extending arms has a bifurcated distal end comprising a penetrating tooth configured to penetrate into a wall of the bore and a limiting shoulder configured to limit penetration of the penetrating tooth into the wall of the bore.

2. The mounting assembly of claim 1, wherein said head portion has a generally hexagonal profile.

3. A mounting assembly configured to retain an elongate member to a support surface defining a bore, said assembly comprising:
    a mount member formed of a polymer material having a head portion configured to contact the support surface and an elongate stud portion extending downwardly from said head portion configured to be received within the bore;
    a clip member formed of a metallic material, attached to the stud portion, configured to be received within the bore with the stud portion, and defining an arcuate portion and a pair of extending arms, wherein each arm of said pair of extending arms has a bifurcated distal end comprising a penetrating tooth configured to penetrate into a wall of the bore and a limiting shoulder configured to limit penetration of the penetrating tooth into the wall of the bore; and
    a spring section having a diaphragm spring extending downwardly from said head portion.

4. The mounting assembly of claim 3, wherein said stud portion includes a center section coextensive with a lengthwise dimension of said stud portion, said center section including a mount aperture arranged for coupling engagement with said clip member.

5. The mounting assembly of claim 4, wherein each arm of said pair of extending arms is angled away from said center section.

6. The mounting assembly of claim 5, wherein said clip member further includes at least one attachment window having an inwardly angled locking tab and wherein said window and said locking tab are arranged for engagement with said mount aperture.

7. A clip member configured for locking engagement with a mount member having an elongate stud portion extending therefrom, the clip member and the stud portion being configured to be simultaneously received within a bore of a support surface, said clip member comprising:
   an arcuate portion;
   a pair of extending arms, wherein each arm of said pair of extending arms has a bifurcated distal end comprising a penetrating tooth configured to penetrate into a wall of the bore and a limiting shoulder configured to limit penetration of the penetrating tooth into the wall of the bore, wherein the clip member is formed of a metallic material; and
   at least one attachment window having an inwardly angled locking tab.

8. The mounting assembly of claim 1, wherein the limiting shoulder is arranged to have an orientation parallel to the bore and the penetrating tooth is arranged to have an orientation angled relative to the bore and to the limiting shoulder.

9. The mounting assembly of claim 8, wherein the penetrating tooth defines an acute angle relative to the limiting shoulder.

10. The mounting assembly of claim 1, wherein the limiting shoulder is canted in an upright position and the penetrating tooth is angled for engagement with the bore.

11. The clip member of claim 7, wherein the limiting shoulder is arranged to have an orientation parallel to the bore and the penetrating tooth is arranged to have an orientation angled relative to the bore and to the limiting shoulder.

12. The clip member of claim 11, wherein the penetrating tooth defines an acute angle relative to the limiting shoulder.

13. The clip member of claim 7, wherein the limiting shoulder is canted in an upright position and the penetrating tooth is angled for engagement with the bore.

14. The mounting assembly of claim 3, wherein the limiting shoulder is arranged to have an orientation parallel to the bore and the penetrating tooth is arranged to have an orientation angled relative to the bore and to the limiting shoulder.

15. The mounting assembly of claim 14, wherein the penetrating tooth defines an acute angle relative to the limiting shoulder.

16. The mounting assembly of claim 3, wherein the limiting shoulder is canted in an upright position and the penetrating tooth is angled for engagement with the bore.

* * * * *